K. W. HEYMAN.
COOLING APPARATUS FOR MILK OR OTHER LIQUIDS.
APPLICATION FILED NOV. 18, 1910.
996,245.
Patented June 27, 1911.
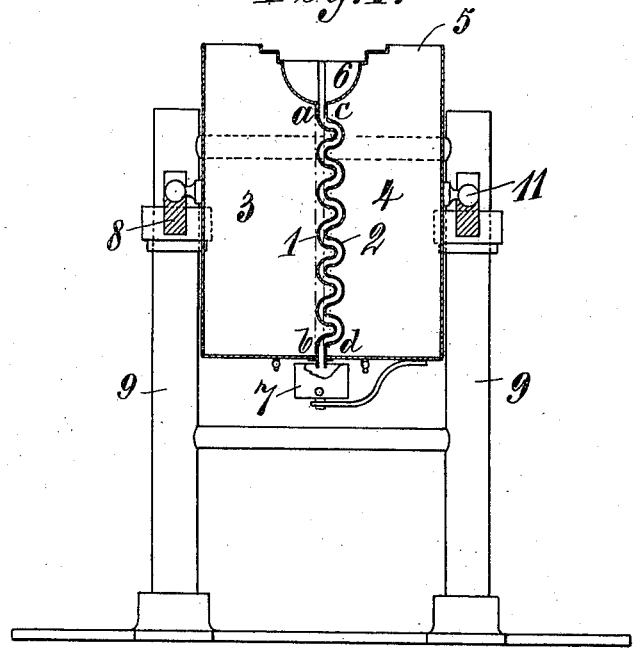
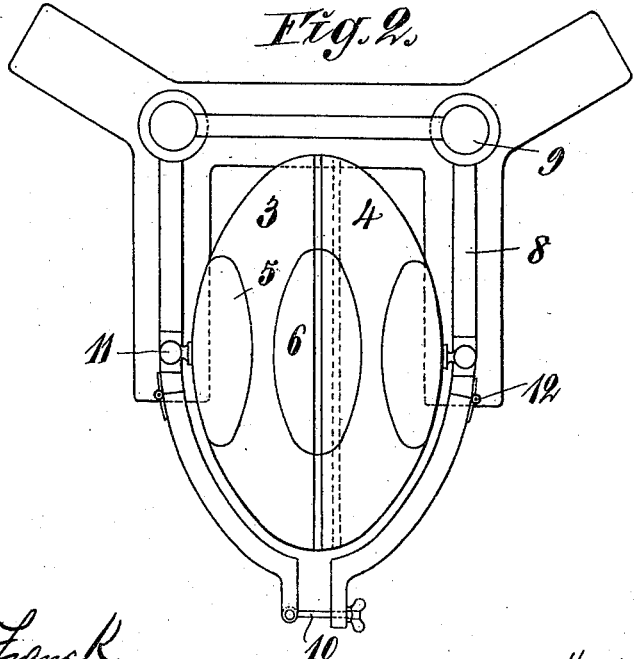

UNITED STATES PATENT OFFICE.

KNUT WALDEMAR HEYMAN, OF SKOGSTORP, TUMBA, SWEDEN.

COOLING APPARATUS FOR MILK OR OTHER LIQUIDS.

996,245.  Specification of Letters Patent.  Patented June 27, 1911.

Application filed November 18, 1910. Serial No. 593,012.

*To all whom it may concern:*

Be it known that I, KNUT WALDEMAR HEYMAN, a subject of the King of Sweden, and resident of Skogstorp, Tumba, in the Kingdom of Sweden, estate-owner, have invented certain new and useful Improvements in Cooling Apparatus for Milk or other Liquids, of which the following is a specification, reference being made to the accompanying drawing.

The present invention relates to cooling apparatus for milk (or other liquids) in which the milk in the form of a thin layer is continuously cooled between the corrugated (or correspondingly formed) walls of vessels containing a suitable cooling agent. The invention has for its purpose to facilitate the cleaning of such apparatus as well as the manufacture of them.

On the accompanying drawing is shown by way of example a milk cooler carried out in accordance with this invention.

Figure 1 shows a vertical section of the cooler, while Fig. 2 shows the same in plan.

The passage in which the milk is cooled in the form of a thin layer, is formed by the corrugated walls 1 and 2 of two vessels 3 and 4, which vessels when the milk is being cooled are filled with a suitable cooling agent, e. g. ice, and water formed from it. The ice is dropped into the cooling vessels 3 and 4 through openings 5 in the upper portions of the vessels. The milk which is to be cooled runs down into a receptacle 6, formed by depressions in the said portions, from which receptacle 6 the milk passes into the cooling passage, and the milk thus cooled is received by a vessel 7 placed below the cooling vessels 3 and 4. The cooling vessels are carried by arms 8, which may be swung on standards 9, and are kept together by means of a device, e. g.—as shown—a screw bolt 10 rotatably fixed to the one arm, and a wing nut fitted on to the screw bolt and acting on the other arm, said wing nut also serving to regulate the distance between the arms or the cooling vessels (in their usual position) and thus the thickness of the cooling passage.

When the wing nut has been loosened and the bolt turned, the cooling vessels can be swung apart from each other, so that those of their surfaces which are acting at the cooling process become accessible for cleaning.

The cooling vessels 3 and 4 should preferably be mounted on the arms 8 by means of pivots 11, so that the vessels, after having been moved away from each other by swinging the arms, can be turned in such a manner that the ridges of the cooling walls 1 and 2 extend vertically. This position of the ridges is particularly suitable in cleaning the cooling walls, as the water then runs off considerably more rapidly than if the ridges are horizontal.

The pivots 11 should, as shown, be ball-shaped, as the cooling walls can then be more easily brought into a proper position relatively to each other, when bringing the cooling vessels together.

In order to enable the cooling vessels to be turned in the manner just indicated, unimpeded by the arms 8, each of these latter is divided into two parts which are connected with each other by means of a hinge 12. The outer parts of the arms 8 can thus be swung backwardly on their hinges and turned out of the way of the cooling vessels 3 and 4, when the latter are to be turned. The arms may also be prolonged forward sufficiently so as not to prevent the cooling vessels being turned.

As may be seen from Fig. 1, the ridges of the cooling wall 1 lie entirely on the right side of the plane *a—b*, in which the upper and lower parts of the wall are situated, and the cooling wall 2 is formed in a corresponding way, *i. e.* its ridges lie entirely on the right side of the plane *c—d* in which the upper and lower parts of this wall are situated. By this arrangement of the cooling walls 1 and 2 is attained a simplification in the manufacture of these walls, as well as the advantage that the distance between them is constant right out to their lateral edges, which are situated in the same plane as the upper and lower parts of the respective walls. Moreover, tightening between the lateral edges is obtained by means of this arrangement without the aid of special tightening means.

When the vessels 3 and 4 are juxtaposed their upper edges rest against each other thus holding the vessels in the upright position shown in Fig. 1 of the drawing.

Having now described my invention, what I claim as new and desire to secure by Letters Patent is:

1. In an apparatus of the character described, the combination with cooling vessels each having a corrugated cooling wall, of pivoted arms supporting said vessels whereby said arms can be swung wide apart, so that the cooling surfaces of said vessels become completely accessible for cleaning purposes.

2. In an apparatus of the character described, the combination with cooling vessels each having a corrugated cooling wall, of pivoted arms supporting said vessels whereby the arms can be swung wide apart, so that the cooling surfaces of said vessels become accessible for cleaning purposes, and means for holding the cooling vessels together in such a manner that the width of the sinuous cooling passage formed by the cooling surfaces can be varied.

3. In an apparatus of the character described, the combination with cooling vessels each having a corrugated cooling wall, of pivoted arms supporting said vessels, whereby the arms can be swung wide apart, so that the cooling surfaces of said vessels become completely accessible for cleaning purposes, means for holding the cooling vessels together in such a manner that the width of the sinuous cooling passage formed by the cooling surfaces can be varied, and means whereby said vessels are carried by said arms and whereby the vessels can be turned so that the corrugations run vertically.

4. In an apparatus of the character described, the combination of cooling vessels each having a corrugated cooling wall, the corrugations of the one wall being situated outside the plane in which the upper and lower portions of the wall are located, and the corrugations of the other wall being situated inside the plane in which the upper and lower portions of this wall are located, and pivoted arms supporting said vessels, whereby the arms can be swung wide apart, so that the cooling surfaces of the vessels become completely accessible for cleaning purposes.

In witness whereof I have hereunto set my hand in presence of two witnesses.

KNUT WALDEMAR HEYMAN.

Witnesses:
   HEDWIG MELINDER,
   HOWARD NYSTERM.

---

Copies of this patent may be obtained for five cents each, by addressing the "Commissioner of Patents, Washington, D. C."